(12) United States Patent
Narita et al.

(10) Patent No.: US 6,809,453 B2
(45) Date of Patent: Oct. 26, 2004

(54) INDUCTION MOTOR

(75) Inventors: Kenji Narita, Kawasaki (JP); Takushi Fujioka, Kawasaki (JP); Youichi Tanabe, Kawasaki (JP); Nopporn Jirojjaturonn, Kawasaki (JP); Chanaporn Thanathitipong, Kawasaki (JP); Akihiro Ito, Kawasaki (JP); Michihiro Shibamoto, Kawasaki (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 10/615,843

(22) Filed: Jul. 10, 2003

(65) Prior Publication Data
US 2004/0061396 A1 Apr. 1, 2004

(30) Foreign Application Priority Data

Jul. 17, 2002 (JP) ........................................ 2002-207778

(51) Int. Cl.[7] .............................. H02K 1/06; H02K 1/12; H02K 1/14
(52) U.S. Cl. ........................................ 310/216; 310/268
(58) Field of Search ................................. 310/216–218, 310/254, 261, 267, 268, 112, 114, 166–168, 203, 206

(56) References Cited

U.S. PATENT DOCUMENTS

| | | | | | |
|---|---|---|---|---|---|
| 2,573,283 | A | * | 10/1951 | Seitz | 318/832 |
| 3,229,137 | A | * | 1/1966 | McCarty | 310/268 |
| 4,095,150 | A | * | 6/1978 | Senckel | 310/268 |
| 4,959,578 | A | * | 9/1990 | Varga | 310/268 |
| 5,057,726 | A | * | 10/1991 | Mole et al. | 310/67 R |
| 5,801,473 | A | * | 9/1998 | Helwig | 310/254 |
| 6,320,294 | B1 | * | 11/2001 | Kliman | 310/257 |

* cited by examiner

Primary Examiner—Tran Nguyen
(74) Attorney, Agent, or Firm—Manabu Kanesaka

(57) ABSTRACT

In an axial-air-gap induction motor which has a disk-shaped stator and rotor placed coaxially around a rotating shaft with their surfaces opposing each other across a predetermined gap, the stator and rotor are each composed of a disk-shaped yoke and teeth fitted and secured in the yoke, making it easy to fasten the stator to the bracket, and the rotor to the rotating shaft, as well as to mount windings in the stator core and rotor core.

11 Claims, 11 Drawing Sheets

INDUCTION MOTOR

TECHNICAL FIELD

The present invention relates to an induction motor, and more particularly to a flat (disk-shaped) induction motor which has a disk-shaped stator and rotor placed coaxially with an air gap in the axial direction and is especially suitable for air conditioners.

BACKGROUND ART

A flat induction motor is a motor which has a disk-shaped stator and rotor placed coaxially around a rotating shaft with their surfaces opposing each other. Normally, the stator core and rotor core each have a spiral winding structure made of a magnetic steel strip. A plurality of open slots are formed in the winding structures from the outer edge toward the rotating shaft at equal intervals, leaving part of the magnetic steel strips.

Slots in the stator core are insulated and accept a main winding and auxiliary winding over the insulation while a secondary winding is put in the slots in the rotor core. Examples of such induction motors are described, for example, in Japanese Patent Application Publication No. S55-026029 and S59-113752.

In the induction motor with the above configuration, the auxiliary winding of the stator is connected in series with a capacitor while the main winding is connected in parallel with this series circuit. When an AC power supply is applied to this parallel circuit, a rotating magnetic field is generated in the stator, inducing a current in the secondary winding of the rotor. The interaction between the rotating magnetic field and induced current produces a torque which rotates the rotor.

Such induction motors are flatter and less bulky than radial-gap motors. Thus, they have the advantage of being able to reduce their installation space, and consequently, downsize the equipment such as air conditioners in which they are used.

However, the conventional induction motor with the above configuration, whose stator and rotor consist of winding structures made of magnetic steel plates, has the problem that it is difficult to fasten the stator to a bracket (casing), and the rotor to the rotating shaft.

This problem can be solved by integrally molding a resin bracket on the outer periphery of the stator. However, the use of resin is something to be avoided not only from the viewpoint of cost, but also from the viewpoint of environmental protection because of a waste-disposal problem.

Looking at the stator core and rotor core, the opening of the open slots is made wider to ease insertion of the windings. This tends to increase the reluctance (magnetic reluctance) of the air gap, which causes magnetomotive force to be wasted, resulting in decreased efficiency. Moreover, spatial variation of magnetic flux density in the air gap is increased, which may cause vibration and noise.

To solve this problem, the slot openings of the stator core can be made narrower, which, however, not only requires a dedicated winder, but also lowers the efficiency of winding operations. Similarly, if the slot openings of the rotor core are also made narrower, it becomes difficult to insert rotor windings in the slots.

Incidentally, as an alternative method for forming windings in the narrow slot openings, die casting may be adopted, but this has the problem of increased cost due to increase in the number of manufacturing processes.

SUMMARY OF THE INVENTION

Thus, an object of the present invention is to provide an induction motor which makes it possible to easily fasten the stator to the bracket, and the rotor to the rotating shaft, mount windings in the stator core and rotor core easily, maintain the efficiency of winding operations, reduce vibration and noise, and lower cost.

To achieve the above object, the present invention provides an induction motor which has a disk-shaped stator and rotor placed coaxially around a rotating shaft with their surfaces opposing each other across a predetermined gap and causes a rotating magnetic field generated in the windings of the stator to induce current in windings of the rotor, turning the rotor, wherein:

the stator includes a stator yoke and stator teeth, the stator yoke consists of a laminate made by laminating a plurality of blanked ring-shaped magnetic steel plates in the axial direction, holes for a predetermined number of slots are formed in the stator yoke at equal intervals in the circumferential direction, the stator teeth have first tooth bodies around which stator windings are wound and first tooth tips formed on those ends of the first tooth bodies which oppose the rotor, and the other ends of the first tooth bodies fit in the holes in the stator yoke;

the rotor includes a rotor yoke and rotor teeth, the rotor yoke consists of a laminate made by laminating, in the axial direction, a plurality of blanked disk-shaped magnetic steel plates with a hole for insertion of a rotating shaft at the center, holes for a predetermined number of slots are formed in the rotor yoke at equal intervals in the circumferential direction, the rotor teeth have second tooth bodies which are inserted as rotor windings into a conductor plate and second tooth tips formed on that end of the second tooth bodies which oppose the stator, and the other end of the second tooth bodies fit in the holes in the rotor yoke; and the stator windings are fitted around the first tooth bodies between the stator yoke and first tooth tips, the rotor winding conductor plate is fitted around the second tooth bodies and sandwiched between the rotor yoke and second tooth tips, the stator has the outer edge of the stator yoke secured in a motor bracket, and the rotor is fastened to a rotating shaft held by bearings of the motor bracket.

The induction motor according to the present invention may be not only a single-stator, single-rotor type, but also a single-stator, double-rotor type. Specifically, the present invention has an aspect according to which the induction motor comprises two stators and rotors, the two stators are positioned back to back with each other in the center of the motor bracket, the two rotors are placed in opposing relation to the respective stators, the stator teeth of the two back-to-back stators are aligned with each other, and the windings around the back-to-back stator teeth differ in magnetic polarity from the respective rotors.

According to another aspect, the induction motor may be configured as a double-stator, single-rotor type, the two rotors being positioned back to back with each other in the center of the motor bracket, the two stators being placed in opposing relation to the respective rotors, the stator teeth of the two stators being aligned with each other, and the windings around the stator teeth of the stators differing in magnetic polarity from the respective rotors.

To decrease the failure rate and increase the reliability of the motor, preferably the backs of the stator teeth of the stators positioned back to back with each other or the backs of the rotor teeth of the rotors positioned back to back with each other are welded together by resistance welding.

Also, the stator yoke may be made of a non-magnetic, non-conductive material instead of the laminate of the magnetic steel plates. This will reduce magnetic flux leakage from the stator and improve motor efficiency.

In the present invention, preferably the conductor plate serving as the rotor windings is a metal plate or a laminate of metal plates with holes for accepting the second teeth bodies.

A conductive plate may be used for the rotor yoke itself instead of the magnetic steel plates and may combine the rotor winding conductor. A copper plate or aluminum plate is suitable for the conductive plate because it can reduce magnetic flux leakage from the stator and improve motor efficiency.

In the present invention, preferably the stator teeth and the rotor teeth are laminates made by laminating a plurality of magnetic steel plates in the radial direction of the respective yokes and the widths of the magnetic steel plates in the laminates in the circumferential direction of the respective yokes are narrowed gradually from the outer to the inner edge of the respective yokes. This will ensure an optimum magnetic circuit between the stator and rotor and improve motor efficiency.

Also, the ends of the stator teeth fitted in the stator yoke may be welded to the stator yoke while the ends of the rotor teeth fitted in the rotor yoke may be welded to the rotor yoke. This will increase the strength of the stator and rotor, eliminate rotor eccentricity, and increase the reliability of the motor.

Also, to make it easy and less expensive to fasten both stator and rotor, preferably the stator is fastened by press-fitting the stator yoke in the bracket and the rotor is fastened to the rotating shaft by shrinkage-fitting, press-fitting, or caulking the rotor yoke or the circular conductive plate which combines the rotor winding conductor over the rotating shaft.

Also, a reinforcement plate may be attached to a portion where the rotor is fastened to the rotating shaft to fasten the rotor securely at right angles to the rotating shaft, and thereby prevent eccentricity or run-out of the rotor.

DETAILED DESCRIPTION

Figure 1:
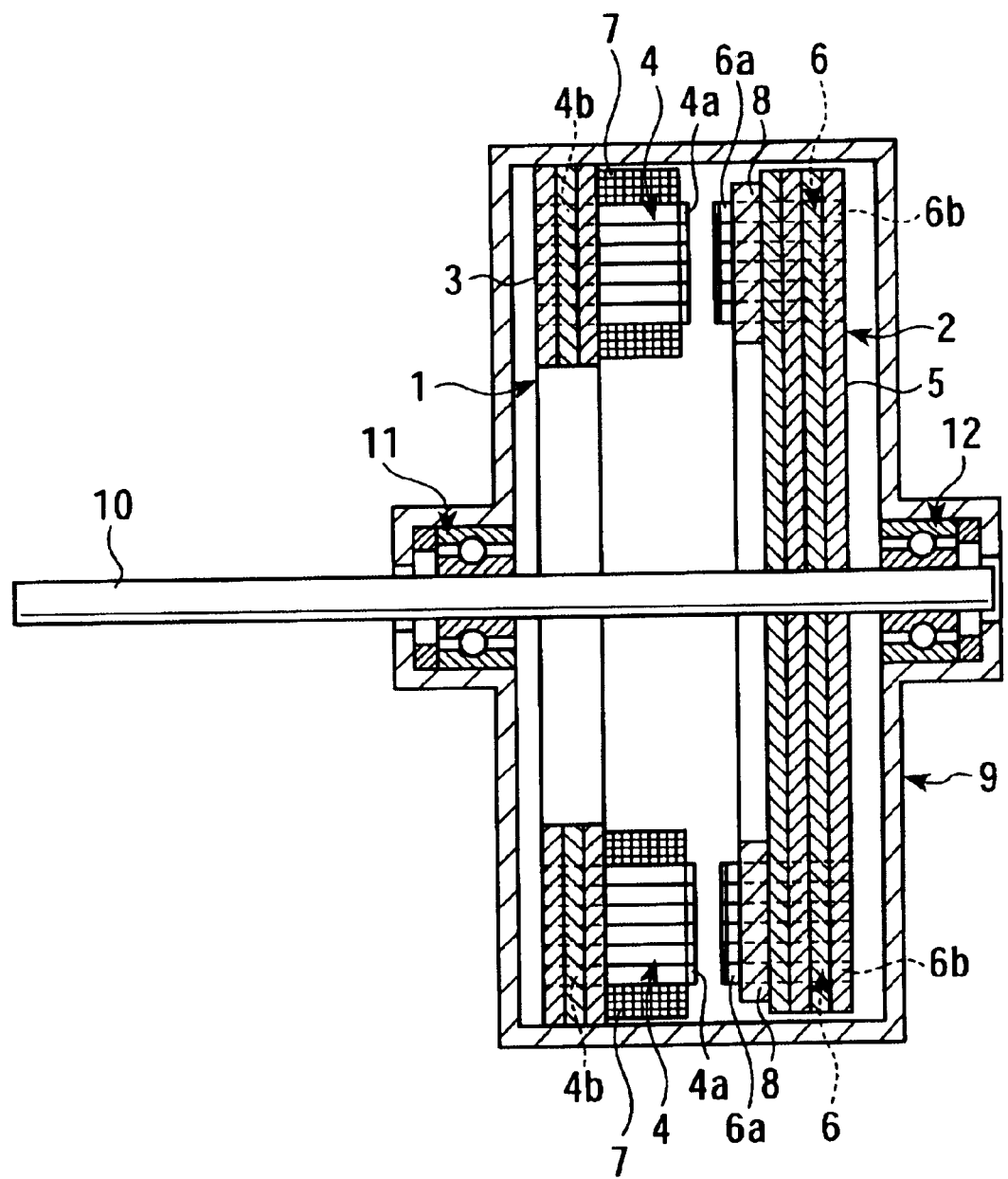
FIG. 1 is a schematic sectional view showing a first embodiment of an induction motor according to the present invention.

Next, some embodiments of the present invention will be described with reference to the drawings, but the present invention is not limited to these embodiments.

First, an induction motor according to a first embodiment of the present invention will be described with reference to FIGS. 1 to 4. This induction motor is a flat induction motor which has a disk-shaped stator 1 and rotor 2 placed coaxially around a rotating shaft 10 with their surfaces opposing each other across an air gap in the axial direction.

The stator 1 has a stator yoke 3 and stator teeth 4 while the rotor 2 has a rotor yoke 5 and rotor teeth 6.

Figure 3:
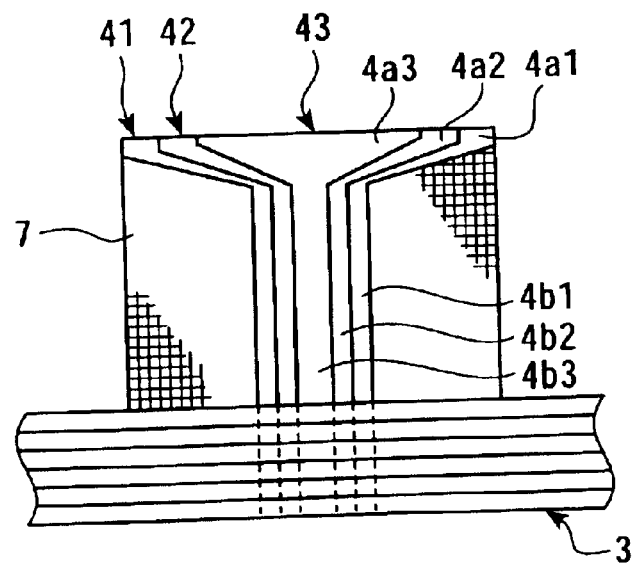
FIG. 3 an enlarged schematic view showing stator teeth.

Each of the stator teeth 4 has a tooth body (first tooth body) 4b with a T-shaped tooth tip (first tooth tip) 4a formed on the end facing the rotor 2 to prevent the winding from coming off (see FIG. 3). Each of the rotor teeth 6 also has a tooth body (second tooth body) 6b with a T-shaped tooth tip (second tooth tip) 6a formed on the end facing the stator 1 to prevent the winding from coming off (see FIGS. 4C and 4D). The tooth bodies 4b of the stator teeth 4 have windings 7 formed around them while the tooth bodies 6b of the rotor teeth 6 hold a rotor winding conductor 8.

The stator yoke 3 is secured in a bracket 9 which constitutes a motor casing while the rotor yoke 5 is fastened to a rotating shaft 10. The rotating shaft 10 is supported by bearings 11 and 12 for example, ball bearings contained in the bracket 9.

Figure 2:
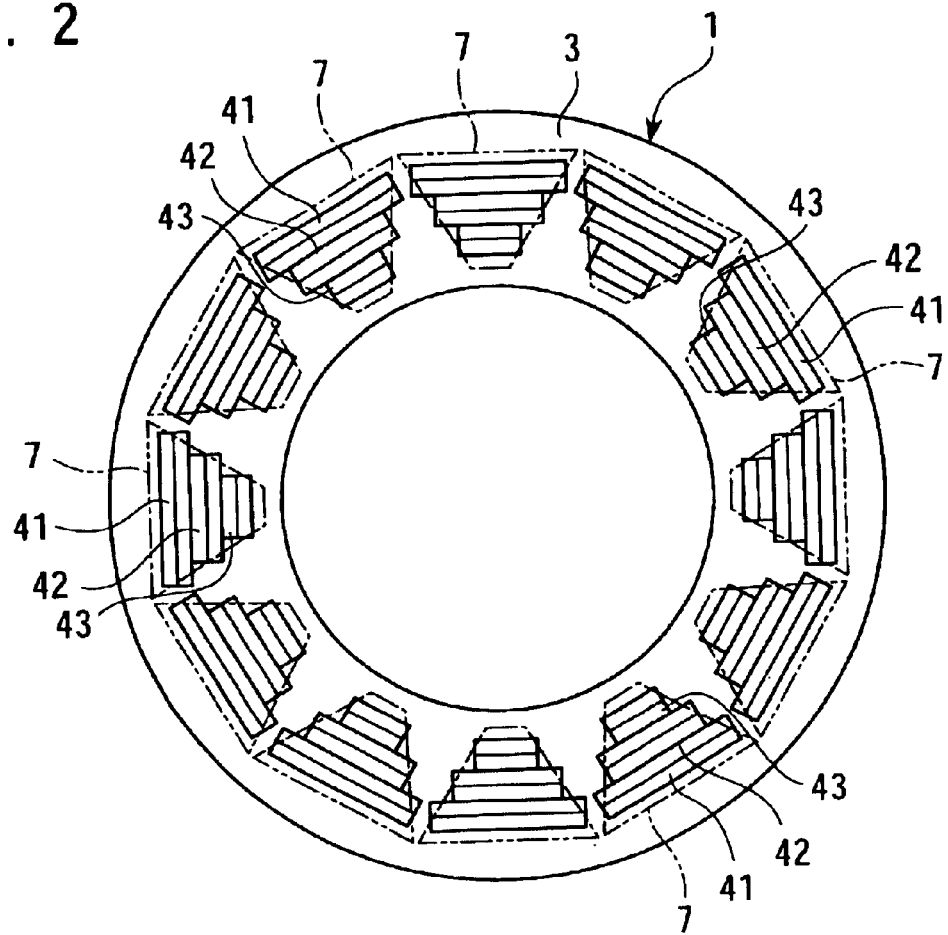
FIG. 2 is a schematic front view showing a stator according to the first embodiment.

As shown in FIGS. 2 and 3, the stator yoke 3 consists of a laminate made by laminating a plurality of blanked ring-shaped magnetic steel plates in the axial direction. Holes 3a (see FIG. 5) corresponding in number to stator slots (12 in this case) are formed in the stator yoke 3 at equal intervals in the circumferential direction to implant the roots of the stator teeth 4.

In this example, each hole 3a is implanted with three stator teeth 41 to 43, which are laminated in the radial direction of the stator yoke 3 as shown in FIG. 3.

Suppose, the stator teeth 41, 42, and 43 are laminated in this order from the outer to the inner edge of the stator yoke 3, then the widths of the tooth bodies in the circumferential direction of the stator yoke 3 are narrowed gradually from the outer to the inner edge of the stator yoke 3 as follows: the tooth body 4b1 of the stator tooth 41>the tooth body 4b2 of the stator tooth 42>the tooth body 4b3 of the stator tooth 43. Consequently, the tooth tips 4a1, 4a2, and 4a3 of the stator teeth 41, 42, and 43 become gradually smaller in this order.

In this example, the stator teeth 4 are made of magnetic steel plates as is the case with the stator yoke 3. The stator teeth 4 are mounted on the stator yoke 3 with the end opposite to the tooth tips 4a inserted in the holes 3a. The number of teeth inserted in the holes 3a may vary from hole to hole.

Figure 4A:
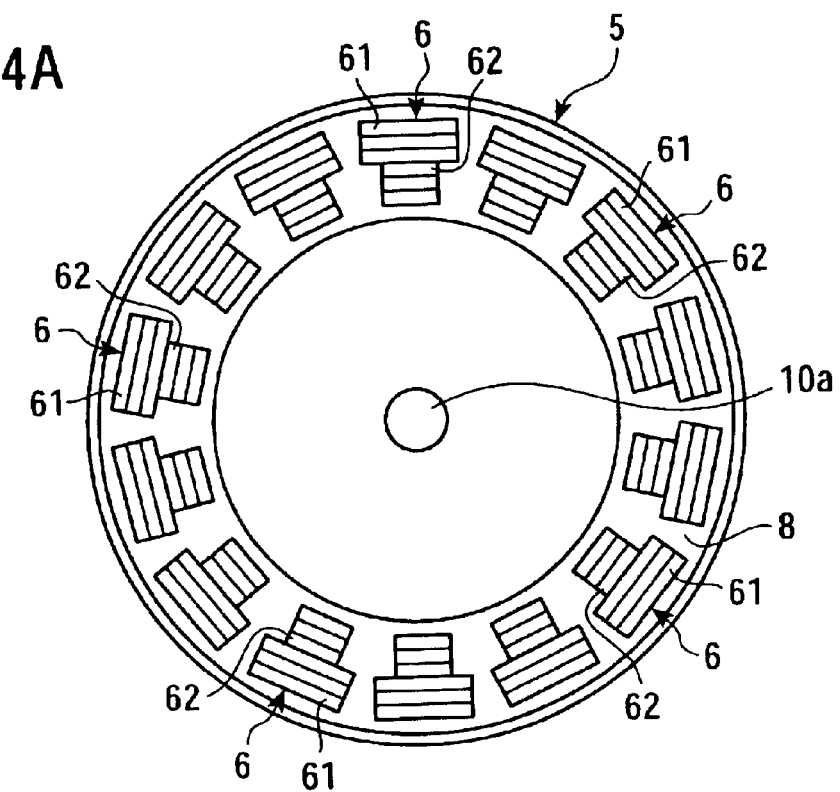
FIG. 4A is a schematic front view showing the rotor according to the first embodiment.
Figure 4B:
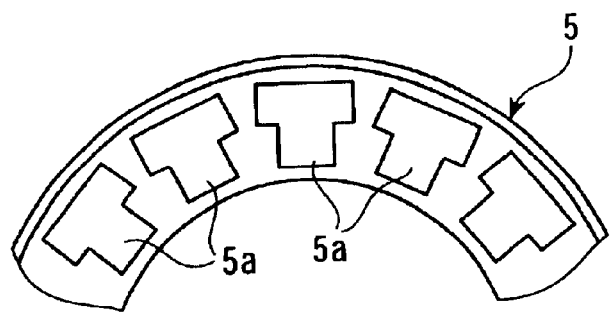
FIG. 4B is a partial view showing holes provided in the rotor.

As shown in FIG. 4A, the rotor yoke 5 consists of a laminate made by laminating a plurality of blanked disk-shaped magnetic steel plates with a hole 10a for insertion of the rotating shaft 10 at the center. Holes 5a (shown in FIG. 4B) corresponding in number to rotor slots (14 in this case) are formed in the rotor yoke 5 at equal intervals in the circumferential direction to accept the roots of the rotor teeth 6. Incidentally, the rotor yoke 5 is smaller in outside diameter than the stator yoke 3.

Figure 4C:
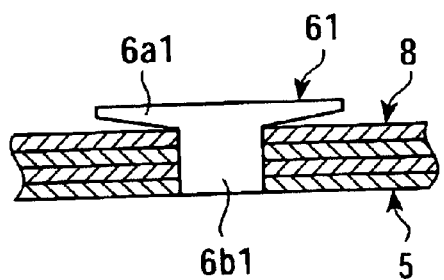
FIGS. 4C and 4D are enlarged partial views showing teeth mounted on the rotor.
Figure 4D:
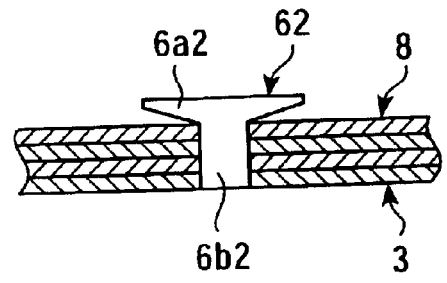

In this example, each hole 5a accepts the rotor teeth 61 and 62, which are laminated in the radial direction of the rotor yoke 5. FIG. 4C shows the rotor tooth 61 placed on the outer side while FIG. 4D shows the rotor tooth 62 placed on the inner side.

As can be seen from the figures, the tooth body 6b1 of the outer rotor tooth 61 is wider than the tooth body 6b2 of the inner rotor tooth 62, as is the case with the stator teeth 4. Regarding the tooth tips 6a again, the tooth tip 6a1 of the outer rotor tooth 61 is larger than the tooth tip 6a2 of the inner rotor tooth 62. The rotor teeth 6 are made of magnetic steel plates as is the case with the stator teeth 4.

The stator 1 windings 7 are fitted around the tooth bodies 4b of the teeth 4 using an inserter (not shown). Alternatively, the windings 7 may be wound around the tooth bodies 4b of the teeth 4 using a winder (not shown).

The rotor winding conductor 8 is a blanked ring-shaped conductor. Although not shown in detail, holes (similar in shape to the holes 5a shown in FIG. 4B) corresponding in number to yoke holes 5a are formed in the rotor winding conductor 8 to accept the tooth bodies 6b of the rotor teeth 6.

The rotor winding conductor 8 is mounted on the rotor yoke 5 with the roots of the rotor teeth 6 inserted in the holes 5a in the rotor yoke 5 such that the tooth tips 6a of the rotor teeth 6 are held firmly in contact with the rotor yoke 5. The outer edge and inner edge of the ring-shaped rotor winding conductor 8 act as short-circuit rings (end rings) while the ring-shaped rotor winding conductor 8 where the tooth bodies 6b are inserted acts as a short-circuiting conductor.

In the induction motor with the above configuration, when an alternating current is sent through the windings 7, an alternating magnetic flux (rotating magnetic field) perpendicular to the surface of the stator 1 is generated. The magnetic flux penetrates the rotor winding conductor 8 by passing through the tooth tips 6a and tooth bodies 6b of the rotor 2, rotor yoke 5, and adjacent tooth bodies 6b and tooth tips 6a and returning to the stator 1.

Consequently, a current is induced in the rotor winding conductor 8 by the alternating magnetic flux. The interaction between the induced current and rotating magnetic field produces a torque (turning force). This force acts at right angles to the short-circuiting conductor of the rotor winding conductor 8, rotating the rotor 2.

Figure 5:
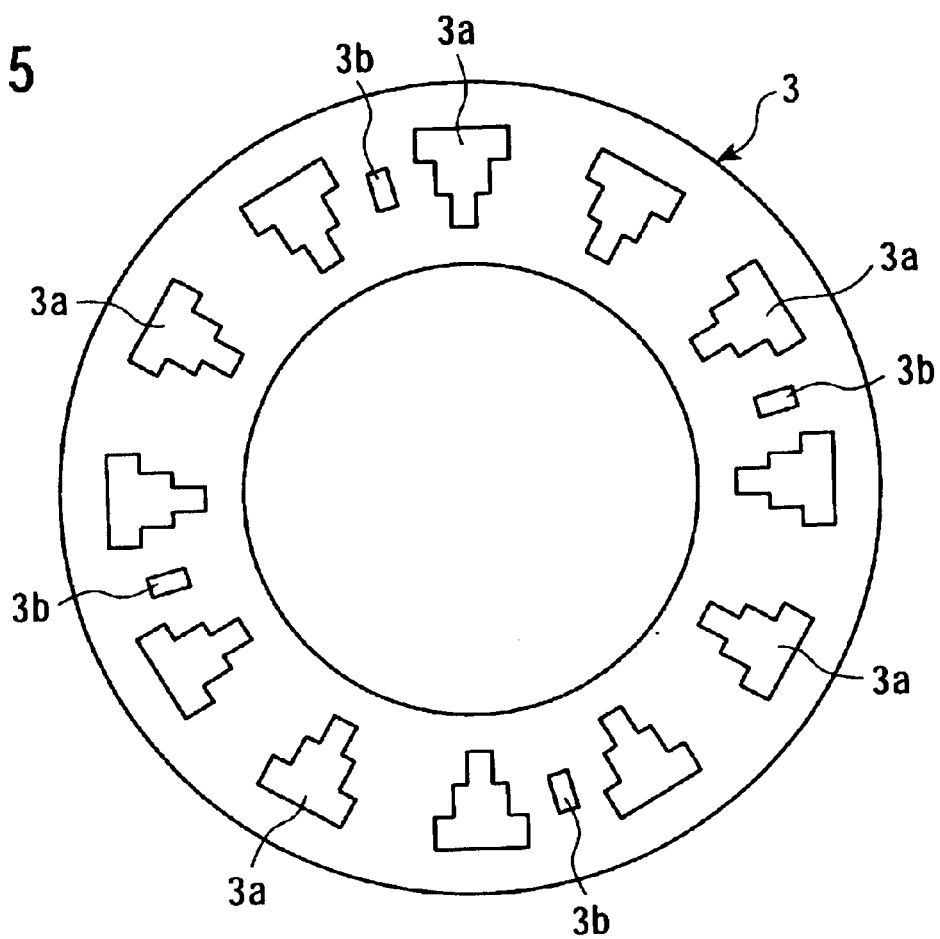
FIG. 5 is a schematic front view showing yoke of the stator in FIG. 2.

Next, an example of manufacturing processes for the stator 1 will be described. An automatic lamination process is used to manufacture the stator yoke 3. The process involves blanking a ring-shaped magnetic steel plate with holes 3a for insertion of the stator teeth 4 (as shown in FIG. 5) using a die (not shown) and laminating a plurality of the magnetic steel plates.

Figure 6:
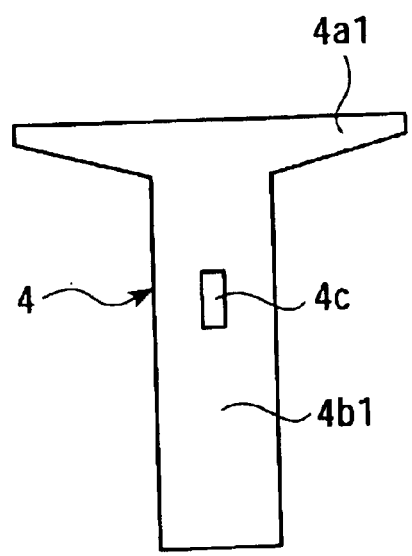
FIG. 6 is an enlarged plan view showing one of the teeth in FIG. 3.

During the blanking and laminating process, it is preferable to provide some caulked parts 3b. Also, the stator tooth 4 with the tooth tip 4a1 and tooth body 4b1 is blanked from a magnetic steel plate (as shown in FIG. 6) using a die and a plurality of the stator tooth 4 are laminated as is the case with the stator yoke 3. In so doing, it is preferable to provide a caulked part 4c as is the case with the stator yoke 3.

Figure 7:
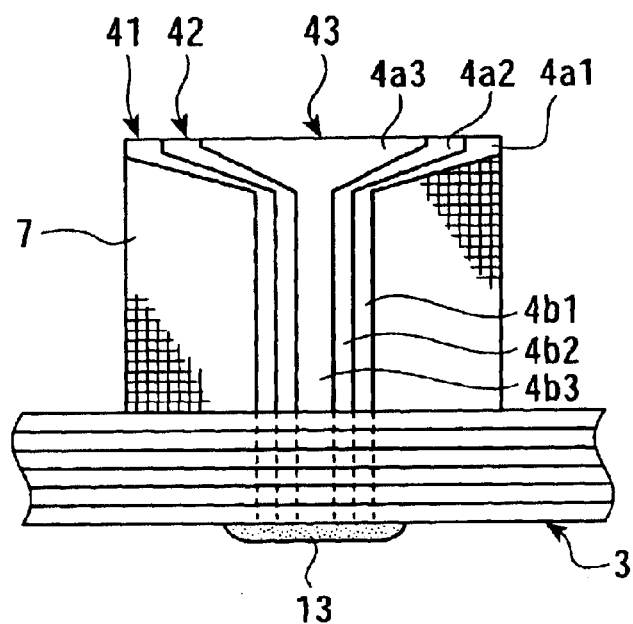
FIG. 7 is a schematic plan view showing a variation of the teeth in FIG. 3.

In this way, the stator teeth 41 to 43 which differ in the width of the tooth body 4b and in the size of the tooth tip 4a are laminated and integrated into the stator teeth 4, the winding 7 is fitted around the tooth bodies 4b from the roots, the roots of the stator teeth 4 are inserted in the holes 3a in the stator yoke 3, and the stator teeth 4 are fastened to the stator yoke 3. Incidentally, as shown in FIG. 7, it is preferable to weld the end 13 of the tooth bodies 4b inserted in the holes 3a in the stator yoke 3.

When fastening the stator 1 to the bracket 9, it is most preferable in terms of the efficiency of assembly work to press-fit the stator yoke 3 consisting of the laminate of the magnetic steel plates in the bracket 9. Incidentally, magnetic flux leakage can be reduced by making the bracket 9 from a non-magnetic material or insulating the outer periphery of the stator yoke 3.

Manufacture of the rotor 2 is similar to that of the stator 1, and thus detailed description thereof will be omitted. To fasten the rotor 2 to the rotating shaft 10, a method such as shrinkage-fitting, press-fitting, or caulking can be used. Incidentally, a copper plate or aluminum plate of a predetermined thickness may preferably be used for the rotor winding conductor 8.

In this way, according to the present invention, the respective yokes 3 and 5 and the respective teeth 4 and 6 are provided for the stator 1 and rotor 2, with the stator yoke 3 fastened to the bracket 9 and the rotor yoke 5 fastened to the rotating shaft 10 by the method described above. This makes it easy to fasten them as well as to mount the stator 1 windings 7 and rotor winding conductor 8. The yokes 3 and 5 as well as the teeth 4 and 6 can be produced easily on a press by the conventional automatic lamination process, reducing their manufacturing costs.

Furthermore, since the stator windings 7 and rotor winding conductor 8 are applied to the teeth 4 and 6, which are then inserted in the respective yokes 3 and 5 and fastened, even if the slot openings of the stator core and rotor core are very narrow, the stator windings 7 and rotor winding conductor 8 can be applied easily.

This makes it possible to decrease the reluctance of the axial air gap and increase motor torque using the magnetomotive force, and thereby achieve high efficiency. Also, spatial variation of magnetic flux density in the axial air gap can be decreased, reducing vibration and noise.

Figure 8:
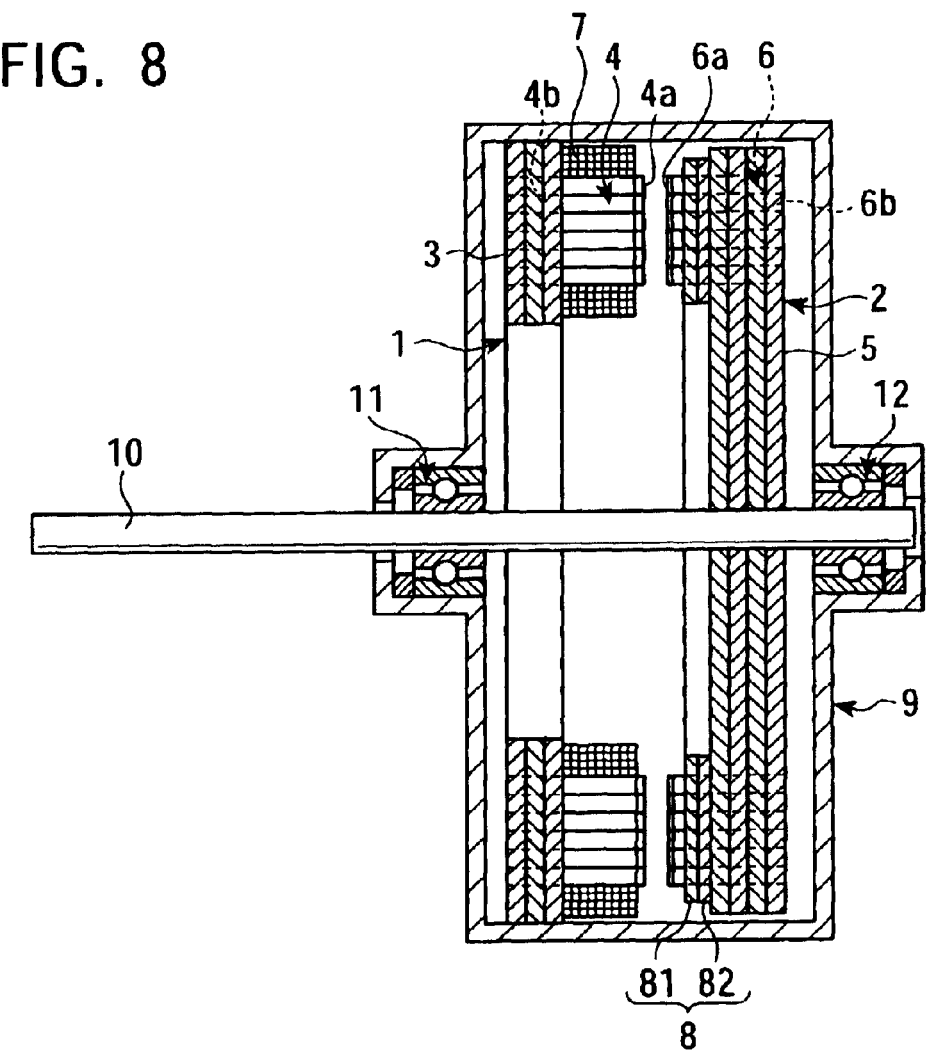
FIG. 8 is a schematic sectional view showing a variation of the induction motor with rotor windings different from those of the first embodiment.

FIG. 8 is a schematic sectional view showing an induction motor according to a variation of the first embodiment, where the same components as those in FIG. 1 are denoted by the same reference numerals as the corresponding components in FIG. 1 and redundant description thereof will be omitted.

This variation differs from the first embodiment in that a laminate of disk-shaped conductors is used as the rotor winding conductor 8.

Specifically, the rotor winding conductor 8 according to the first embodiment costs high because it is obtained by processing a copper plate or aluminum plate of a predetermined thickness. Thus, this variation employs the rotor winding conductor 8 made by laminating two disk-shaped conductors 81 and 82 blanked out of a copper plate or aluminum plate approximately equal in thickness to the magnetic steel plates which compose the stator 1 or rotor 2, and thereby reduces costs.

Next, configuration of an induction motor according to a second embodiment of the present invention will be described with reference to FIGS. 9 to 12, where the same components as those in FIG. 1 are denoted by the same reference numerals as the corresponding components in FIG. 1 and redundant description thereof will be omitted.

Figure 9:
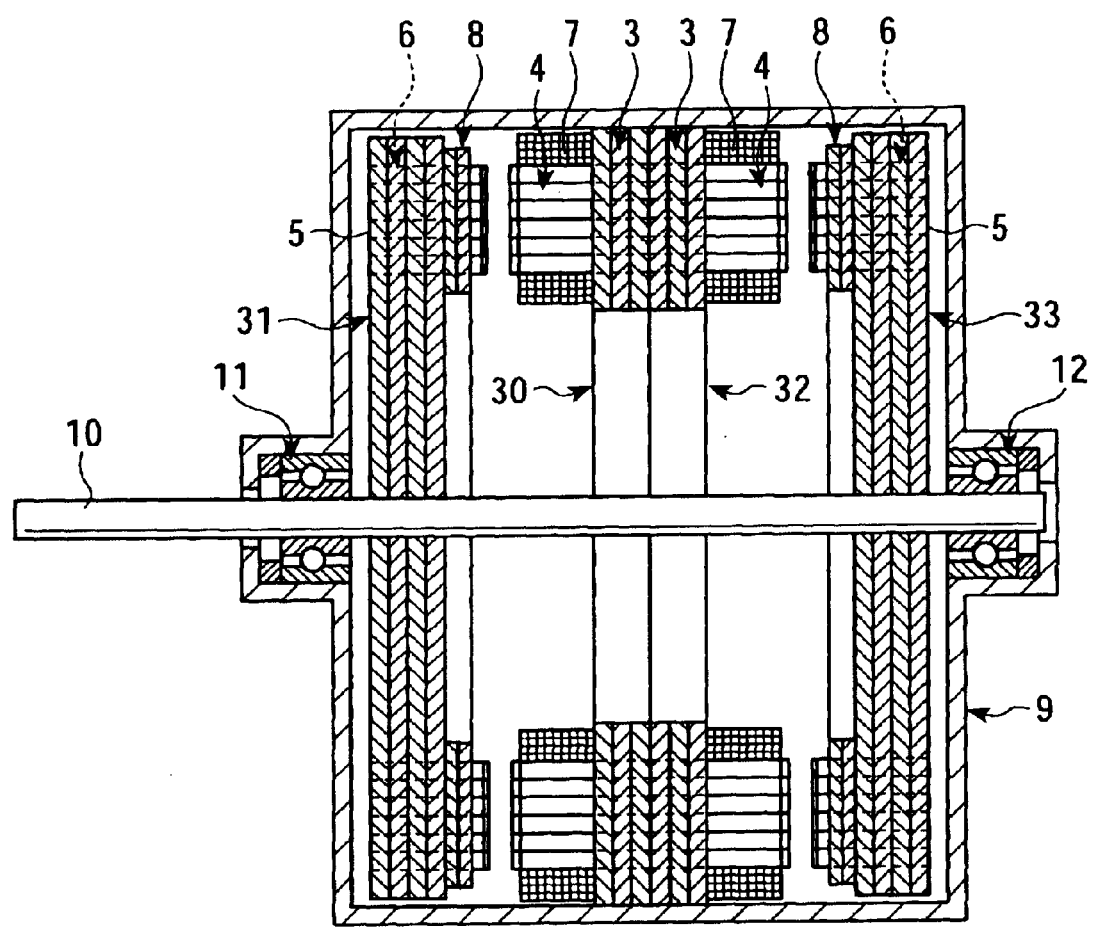
FIG. 9 is a schematic sectional view showing a second embodiment of the induction motor according to the present invention.

Referring to FIG. 9, the induction motor according to the second embodiment comprises two motors: a first motor which contains a stator 30 and rotor 31, and a second motor which contains a stator 32 and rotor 33. The configurations of the individual stators 30 and 32 and rotors 31 and 33 may be the same as those in the first embodiment.

The stators 30 and 32 are positioned back to back with each other in the center of the bracket 9. The rotor 31 is placed opposite to the stator 30 and fastened to the rotating shaft 10 while the other rotor 33 is placed opposite to the stator 32 and fastened to the rotating shaft 10.

Figure 10:
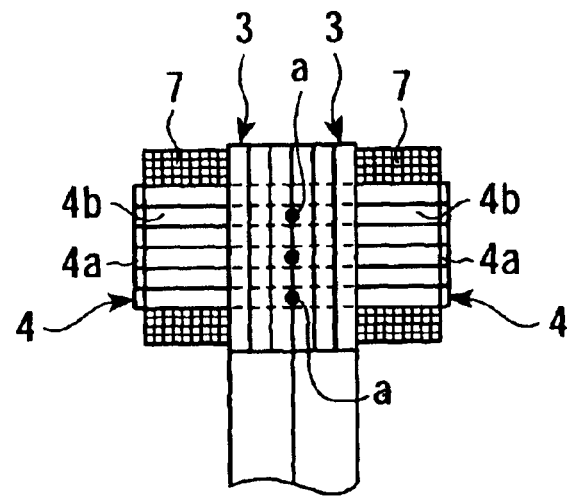
FIG. 10 is a partial sectional view showing welds on a stator according to the second embodiment.

In this single-stator, double-rotor induction motor, the stators 30 and 32 are connected by welding the tooth bodies 4b of the stator teeth 4 on the stator 30 and the tooth bodies 4b of the stator teeth 4 on the stator 32 to each other as shown in FIG. 10 (sectional view). Since the stator teeth 4 consist of a laminate of magnetic steel plates, it is preferable to provide two or more welds a instead of one.

Figure 11:
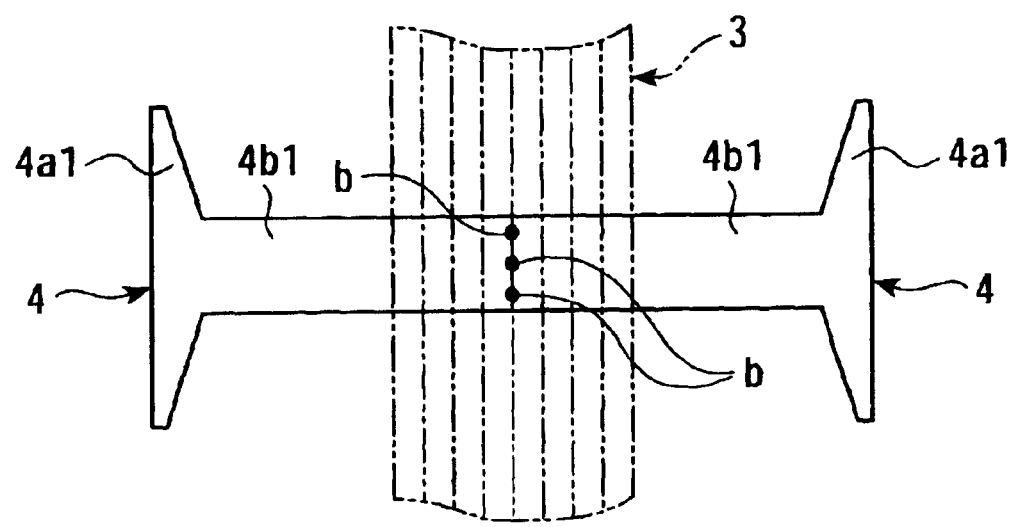
FIG. 11 is a partial plan view showing welds on the stator according to the second embodiment.

Also, as shown in FIG. 11 (plan view), preferably two or more welds b are made where the roots of the stator teeth 4 are butted together. As a means of welding, resistance welding is preferably used.

Figure 12:
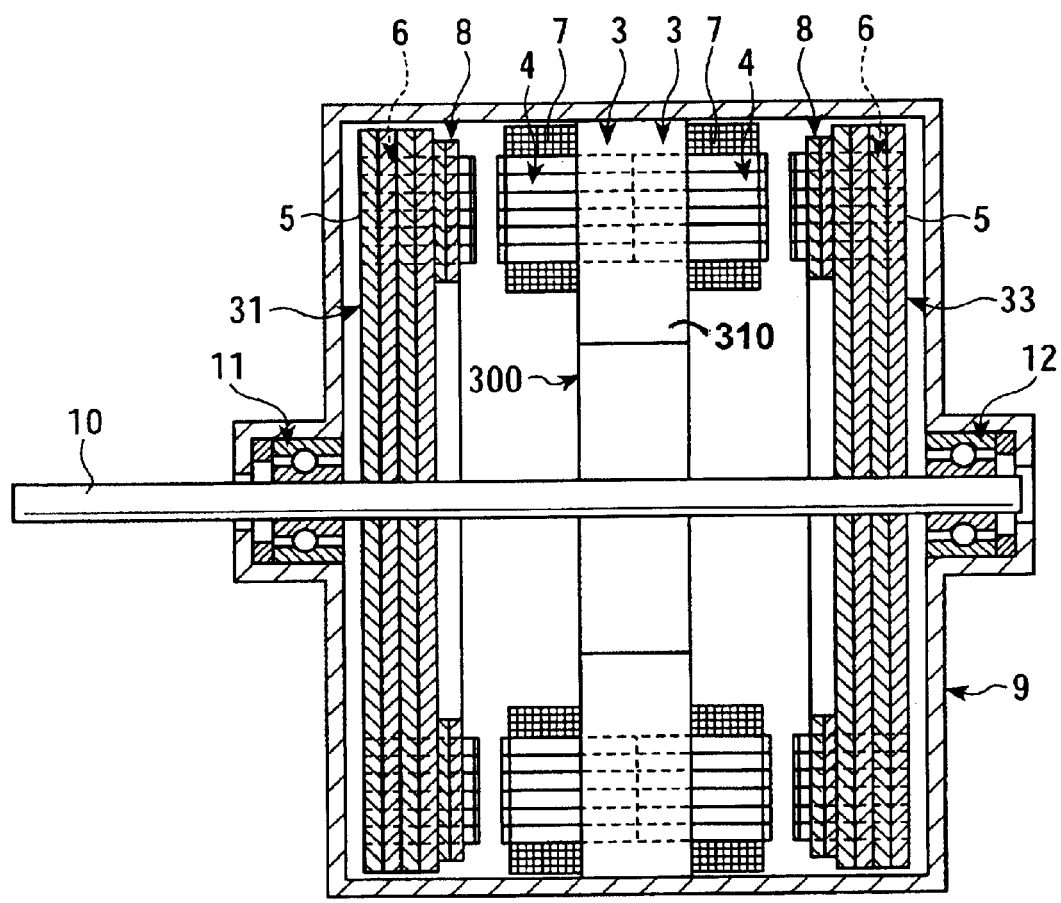
FIG. 12 is a schematic sectional view showing a variation of the second embodiment.

FIG. 12 shows a variation of the second embodiment, where the same components as those in FIG. 9 are denoted by the same reference numerals as the corresponding components in FIG. 9 and redundant description thereof will be omitted.

In this variation, the two stators 30 and 32 according to the second embodiment are integrated into a single stator 300. The stator 300 comprises a stator yoke 310 made of a non-magnetic, non-conductive material such as ceramic or synthetic resin.

The stator yoke 310 is an alternative to the stators 30 and 32 and the stator yokes 3 and 3. It supports the stator teeth 4 of the stator 30 and the stator teeth 4 of the stator 32. The stator yoke 310 is preferably made of Bakelite, which has high mechanical strength. Alternatively, a resin laminate may be used.

Figure 13:
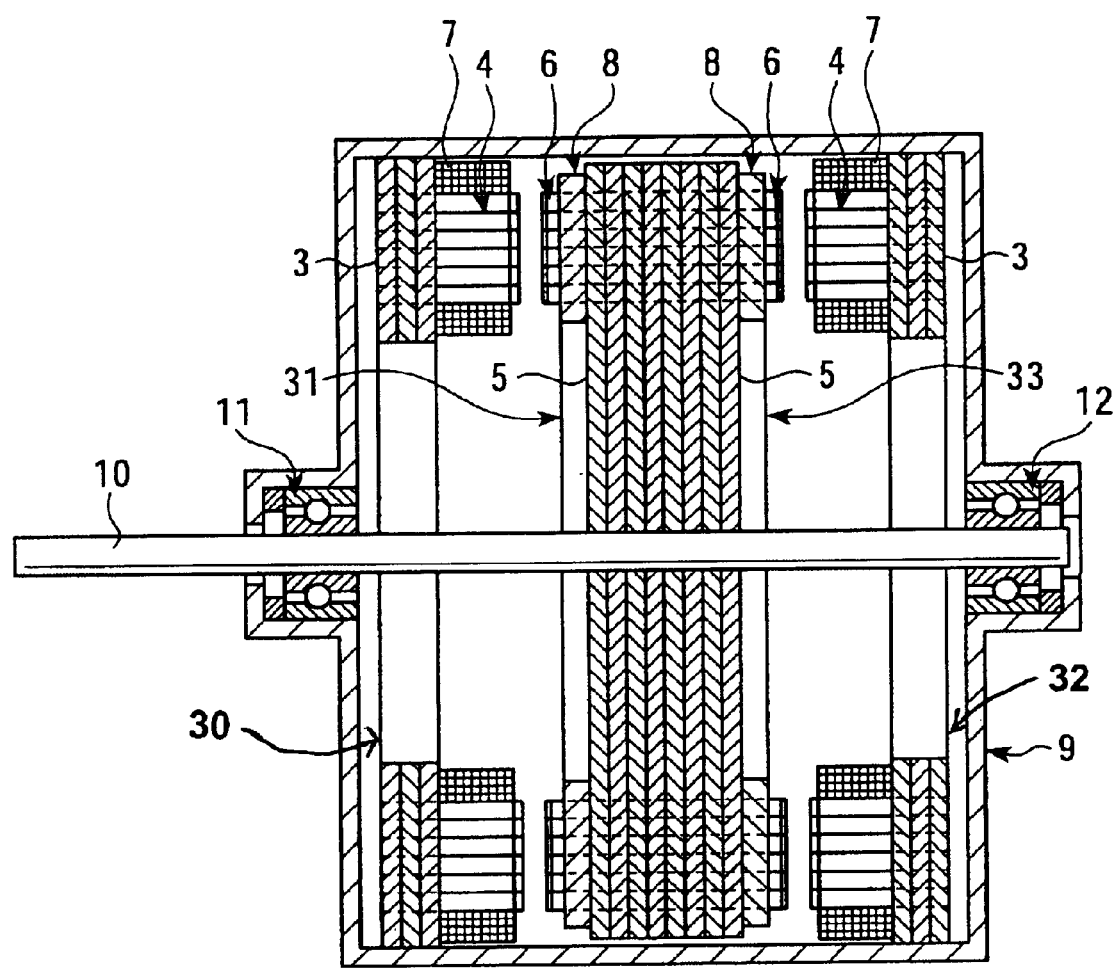
FIG. 13 is a schematic sectional view showing a third embodiment of the induction motor according to the present invention.

FIG. 13 shows a third embodiment of the present invention. This embodiment is a variation to a double-stator, single-rotor induction motor. As is the case with the second embodiment described with reference to FIG. 9, it comprises two motors: a first motor which contains a stator 30 and rotor 31, and a second motor which contains a stator 32 and rotor 33.

Specifically, according to the third embodiment the rotors 31 and 33 are fastened to the rotating shaft 10 and positioned back to back with each other in the center of the bracket 9. The stator 30 is placed opposite to the rotor 31 and fastened to the inner wall of the bracket 9 while the other stator 32 is placed opposite to the rotor 33 and fastened to the inner wall of the bracket 9.

Again, it is preferable to weld the rotor teeth 6 of the rotor 31 and the rotor teeth 6 of the rotor 33 together, as with the example described with reference to FIGS. 10 and 11.

Figure 14:
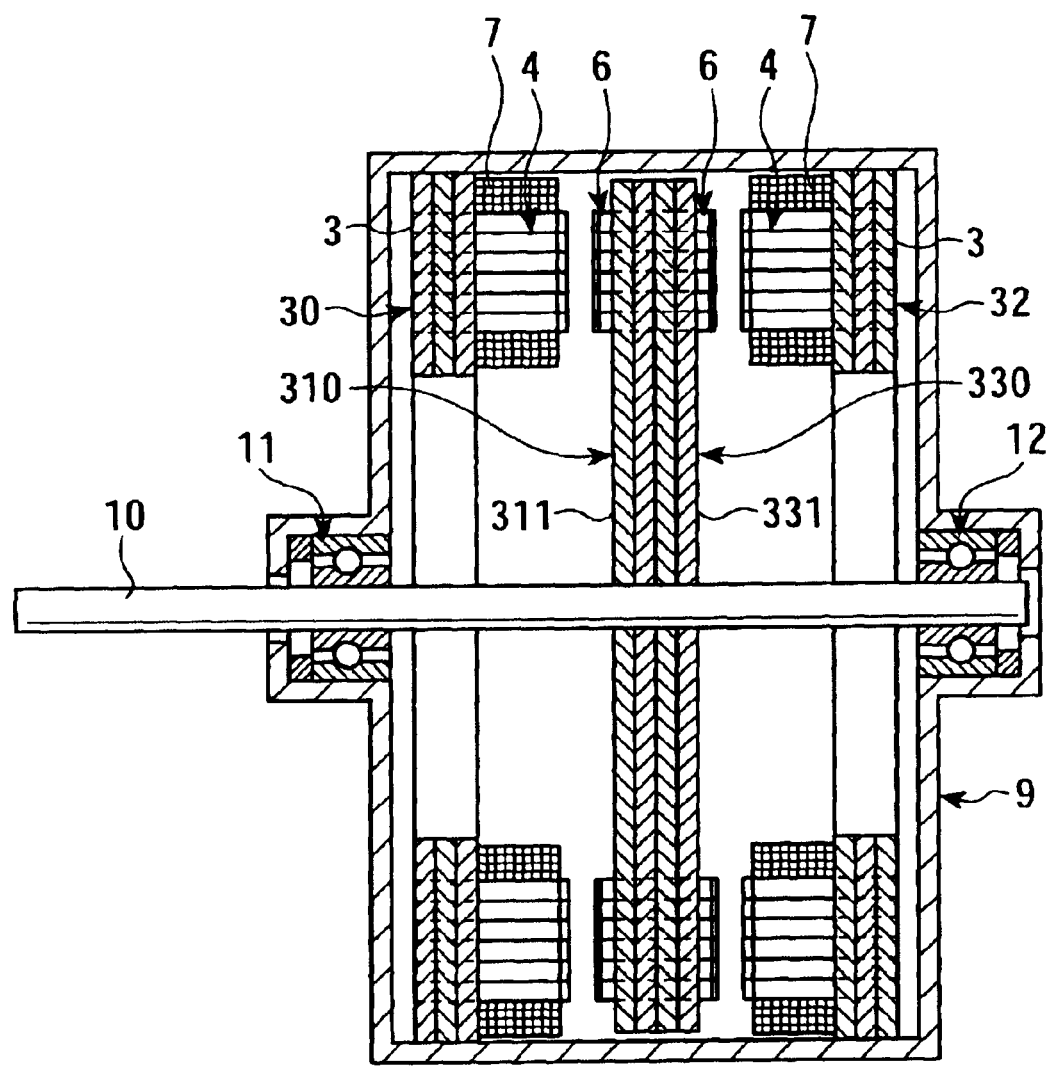
FIG. 14 is a schematic sectional view showing a variation of the third embodiment.

FIG. 14 shows a variation of the third embodiment, where the same components as those in FIG. 13 are denoted by the same reference numerals as the corresponding components in FIG. 13 and redundant description thereof will be omitted.

Instead of the rotors 31 and 33 with their rotor yokes 5 and 5 made of magnetic steel plates according to the third embodiment, this variation employs rotors 310 and 330 positioned back to back with each other with rotor teeth 6 and 6 fastened to rotor yokes 311 and 331 made of conductive material.

A copper plate or aluminum plate (including a laminate) may preferably be used for the rotor yokes 311 and 331. This variation does not need separate rotor winding conductors because the rotor yokes 311 and 331 themselves function as rotor winding conductors. This makes it possible to reduce the axial width of the bracket 9, resulting in a low-profile induction motor.

Figure 15:
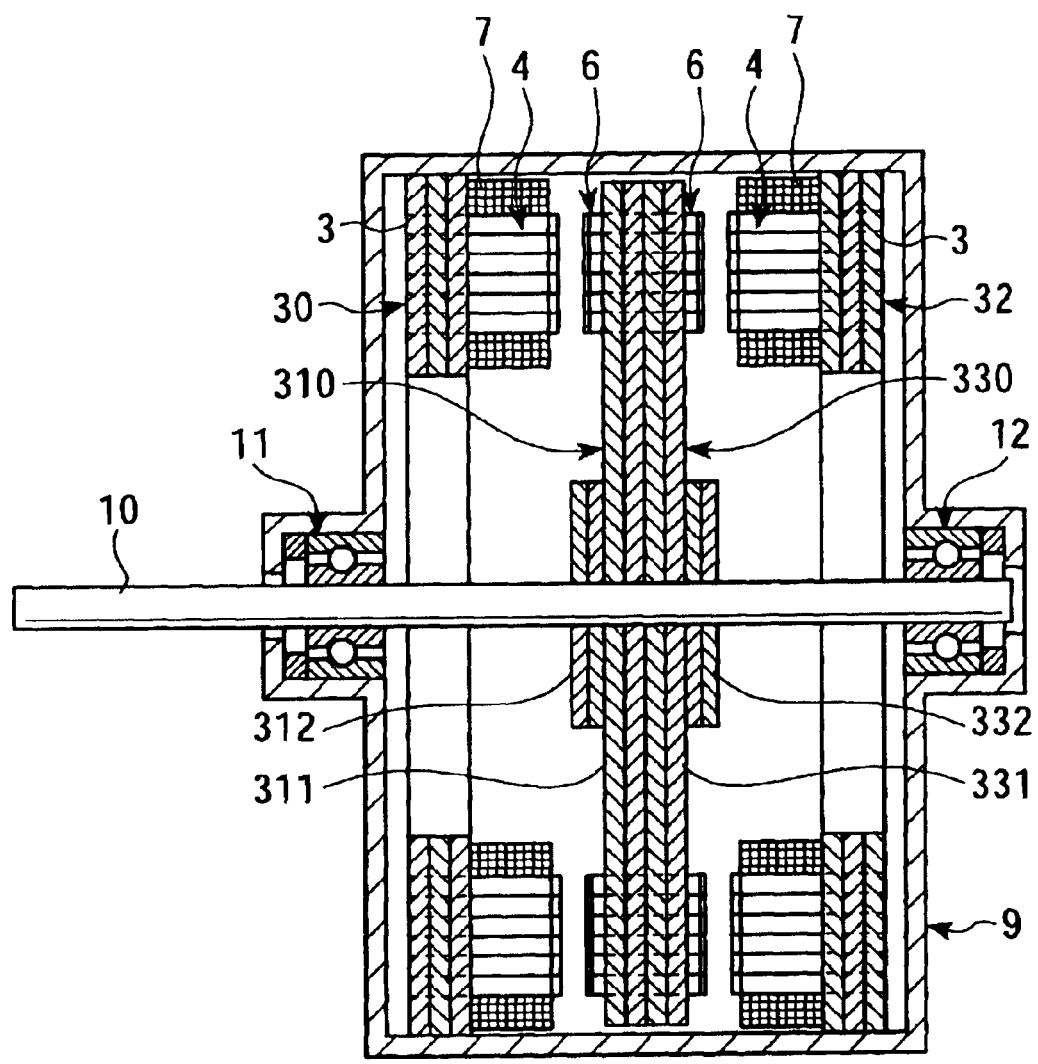
FIG. 15 is a schematic sectional view showing another variation of the third embodiment.

Also, as shown in FIG. 15, by integrally attaching reinforcement plates 312 and 332 by welding or the like to a portion where the respective rotors 310 and 330 are fastened to the rotating shaft 10, and thereby holding the rotors 310 and 330 at right angles to the rotating shaft 10, it is possible to prevent eccentricity or run-out of the rotors 310 and 330 effectively.

The reinforcement plates 312 and 332 may be either metal plates or resin plates as long as they are rigid enough, but copper plates are preferable. The reinforcement plates are also applicable to the embodiments described above.

In the double-rotor induction motor, as is the case with the first embodiment, when rotating magnetic fields are produced in the stator windings, a current is induced in the rotor winding conductors and the interaction between the rotating magnetic fields and induced current produces a torque, rotating the rotors.

Incidentally, the corresponding windings in the two stators generate magnetic fluxes oriented in the same direction and are opposite in polarity to the respective rotors.

What is claimed is:

1. An induction motor which has a disk-shaped stator and rotor placed coaxially around a rotating shaft with stator and rotor surfaces opposing each other across a predetermined gap and causes a rotating magnetic field generated from windings in the stator to induce current in windings of the rotor, turning the rotor, wherein:

the stator includes a stator yoke and stator teeth, the stator yoke is formed of a laminate made by laminating a plurality of blanked ring-shaped plates in an axial direction wherein the blanked ring-shaped plates are formed by magnetic steel plates or nonmagnetic plates, holes for a predetermined number of slots are formed in the stator yoke at equal intervals in a circumferential direction, the stator teeth have first tooth bodies with stator windings wound around thereon and first tooth tips formed on those ends of the first tooth bodies opposing the rotor, and the other ends of the first tooth bodies fit in the holes in the stator yoke;

the rotor includes a rotor yoke and rotor teeth, the rotor yoke is formed of a laminate made by laminating, in the axial direction, a plurality of blanked disk-shaped plates wherein the blanked disk-shaped plates are formed by magnetic steel plates or nonmagnetic plates and said blanked disk-shaped plates has a hole for insertion of a rotating shaft at a center, a plurality of holes for a predetermined number of slots are formed in the rotor yoke at equal intervals in a circumferential direction, the rotor teeth have second tooth bodies inserted into holes of a blanked ring-shaped conductor corresponding to said rotor yoke holes, wherein said blanked ring-shaped conductor functions as rotor windings and second tooth tips formed on ends of the second tooth bodies opposing the stator, and the other end of the second tooth bodies fit in the holes in the rotor yoke; and the stator windings are wound around the first tooth bodies between the stator yoke and first tooth tips, the rotor blanked ring-shaped conductor as a winding plate is fitted around the second tooth bodies and sandwiched between the rotor yoke and second tooth tips, the stator has an outer edge of the stator yoke secured in a motor bracket, and the rotor is fastened to the rotating shaft held by bearings of the motor bracket.

2. The induction motor according to claim 1, wherein the induction motor is a single-stator and double-rotor induction motor comprising a single stator having two stator portions positioned back to back with each other in a center of the motor bracket, and two rotors placed in opposing relation to the respective stator portions, the stator teeth of the two back-to-back stator portions being aligned with each other, and the windings around the stator teeth differing in magnetic polarity from the respective rotors.

3. The induction motor according to claim 1, wherein the induction motor is a double-stator and single-rotor induction motor comprising two stators and a rotor, the rotor having two rotor portions positioned back to back with each other in a center of the motor bracket, the two stators being placed in opposing relation to the respective rotor portions, the stator teeth of the two stators being aligned with each other, and the windings around the stator teeth differing in magnetic polarity from the respective rotors.

4. The induction motor according to claim 2, wherein backs of the stator teeth of the stator portions positioned back to back with each other are welded together by resistance welding.

5. The induction motor according to claim 3, wherein backs of the rotor teeth of the rotor portions positioned back to back with each other are welded together by resistance welding.

6. The induction motor according to claim 1, wherein the rotor blanked ring-shaped conductor winding plate is a metal plate or a laminate of metal plates with holes in a ring shape for accepting the second teeth bodies.

7. The induction motor according to claim 1, wherein ends of the stator teeth fitted in the stator yoke are welded to the stator yoke.

8. The induction motor according to claim 1, wherein ends of the rotor teeth fitted in the rotor yoke of the rotor are welded to the rotor yoke.

9. The induction motor according to claim 1, wherein a reinforcement plate is attached to a portion where the rotor is fastened to the rotating shaft.

10. The induction motor according to claim 1, wherein the stator is fastened by press-fitting the stator yoke in the motor bracket and the rotor is fastened to the rotating shaft by shrinkage-fitting, press-fitting, or caulking.

11. The induction motor according to claim 1, wherein the conductive plate is a copper plate or aluminum plate.

* * * * *